(12) United States Patent
Rask et al.

(10) Patent No.: US 7,412,322 B1
(45) Date of Patent: Aug. 12, 2008

(54) METHOD AND APPARATUS FOR ENGINE CONTROL DURING AUTO-IGNITION COMBUSTION

(75) Inventors: Rodney B. Rask, Grosse Pointe Woods, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/829,351

(22) Filed: Jul. 27, 2007

(51) Int. Cl.
*G06F 17/00* (2006.01)
*F02B 17/00* (2006.01)
*F02B 5/00* (2006.01)

(52) U.S. Cl. .................... 701/104; 123/295

(58) Field of Classification Search ......... 701/103–105, 701/102, 101, 115; 123/295, 305
See application file for complete search history.

(56) References Cited

U.S. PATENT DOCUMENTS 7,263,968 B2 * 9/2007 Cairns et al. ................ 123/295
2007/0272202 A1 * 11/2007 Kuo et al. .................... 701/103

* cited by examiner

*Primary Examiner*—Hieu T Vo

(57) ABSTRACT

The invention comprises an engine system that is selectively operative in an auto-ignition combustion mode. A control module monitors engine operating states and control engine operation. A control subsystem controls engine operation based upon the monitored engine operating states. The control subsystem operates the engine in the auto-ignition combustion mode, and determines an effective temperature of the cylinder structure of the internal combustion engine based upon the engine operating conditions. An engine operating point is determined. A feed-forward control scheme is executed based upon the effective temperature of the cylinder structure and the engine operating point. The effective temperature of the cylinder structure is determined by monitoring engine power for an elapsed period of time.

26 Claims, 5 Drawing Sheets

METHOD AND APPARATUS FOR ENGINE CONTROL DURING AUTO-IGNITION COMBUSTION

TECHNICAL FIELD

This invention relates to internal combustion engines, and more specifically to controlling operation thereof.

BACKGROUND OF THE INVENTION

The statements in this section merely provide background information related to the present disclosure and may not constitute prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode comprises a distributed, flameless, auto-ignition combustion process that is controlled by oxidation chemistry, rather than by fluid mechanics. In a typical engine operating in HCCI combustion mode, the cylinder charge is nearly homogeneous in composition, temperature, and residual level at intake valve closing time. The typical engine operating in the HCCI combustion mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low NOx emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can operate at stoichiometry with substantial amounts of EGR to achieve effective combustion.

At medium engine speeds and loads, a combination of valve profile and timing (e.g., exhaust recompression and exhaust re-breathing) and fueling strategy has been found to be effective in providing adequate thermal energy to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise can be achieved over a range of operating conditions. The benefits of auto-ignition combustion have been known for many years. The primary barrier to product implementation, however, has been the inability to control the auto-ignition combustion process, i.e., combustion phasing and rate of combustion. Late phasing or very slow combustion will result in partial burns and even possibly misfires. Too early phasing or too rapid combustion will lead to knock.

There is no direct control of start of combustion for an engine operating in the auto-ignition mode, as the chemical kinetics of the cylinder charge determine the start and course of the combustion. Chemical kinetics are sensitive to temperature and, as such, the controlled auto-ignition combustion process is sensitive to temperature. An important variable affecting the combustion initiation and progress is the effective temperature of the cylinder structure, i.e., temperature of cylinder walls, head, valve, and piston crown.

The effective temperature of the cylinder structure during transient engine operation may vary from that attained after sustained steady-state operation at the particular speed and load. When the engine transitions from a high speed/load operating point to a lower speed/load operating point, the temperatures are typically higher than a steady-state temperature for the operating point for a period of time, due to thermal lag and heat capacity of the cylinder structure. Likewise, when the engine transitions from a low speed/load operating level to a higher speed/load operating point, the temperatures are typically lower than a steady-state temperature for the operating point. When temperatures of the cylinder structure are different than the steady state temperature for the operating point, the engine control needs to be adjusted from steady-state control settings to maintain consistent auto-ignition combustion. Several engine control parameters, including, e.g., EGR, fuel pressure, and cam phasing, lag the steady state values for the control system.

Therefore, an engine control system which adapts control of the engine based upon thermal lag and heat capacity of the cylinder structure is desirable.

SUMMARY OF THE INVENTION

A method for controlling a homogeneous charge compression ignition engine includes providing a measured engine coolant temperature and determining an engine coolant temperature bias based on an engine power history. The engine coolant temperature bias is applied to the measured engine coolant temperature to establish an effective engine coolant temperature. An engine actuator is controlled as a function of the effective engine coolant temperature. In one embodiment, determining the engine coolant temperature bias based on an engine power history includes monitoring a moving average of engine power and determining the engine coolant temperature bias based on the moving average of engine power. In another embodiment, determining the engine coolant temperature bias based on an engine power history includes monitoring a moving average of engine fuel flow and determining the engine coolant temperature bias based on the moving average of engine fuel flow.

In accordance with an embodiment of the invention, there is provided an internal combustion engine system, comprising an internal combustion engine that is selectively operative in an auto-ignition combustion mode. There is a control module that is adapted to monitor engine operating states and control engine operation. An engine control subsystem is executable in the control module to control the engine operation based upon the monitored engine operating states. The engine control subsystem comprises code to operate the engine in the auto-ignition combustion mode, and determine an effective temperature of a cylinder structure of the internal combustion engine based upon the engine operating conditions. An engine operating point is determined. Code comprising a feed-forward control of the engine is executed based upon the effective temperature of the cylinder structure and the engine operating point. The effective temperature of the cylinder structure of the internal combustion engine is determined by monitoring engine power for an elapsed period of time, i.e., an engine power history.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

Figure 1:
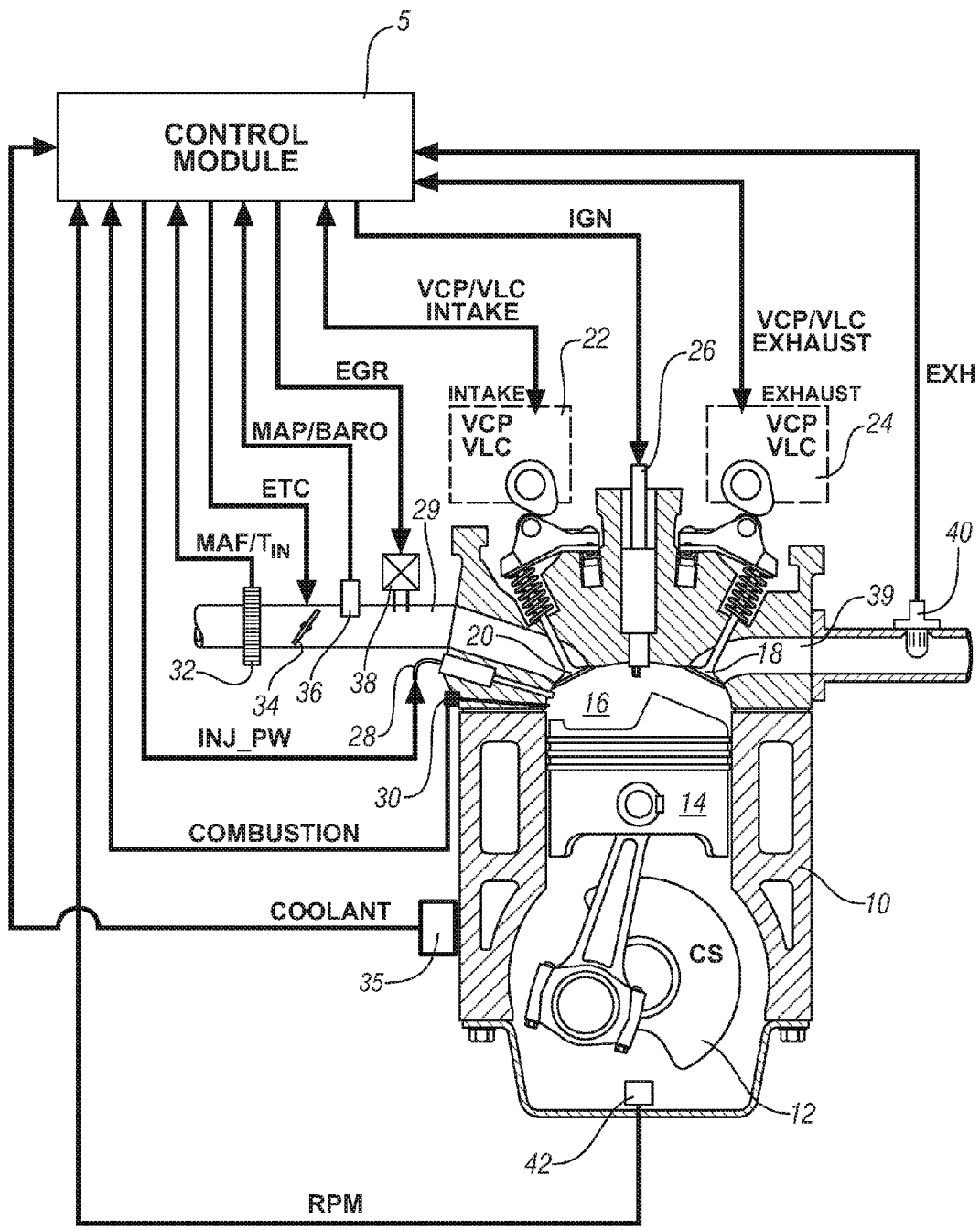
FIG. 1 is a schematic drawing of an engine system, in accordance with the present invention.

Referring now to the drawings, wherein the depictions are for the purpose of illustrating the invention only and not for the purpose of limiting the same, FIG. 1 depicts a schematic diagram of an internal combustion engine 10 and accompanying control module 5 that have been constructed in accordance with an embodiment of the invention.

The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 ('CS') by which their linear reciprocating motion is translated to rotational motion. There is an air intake system which provides intake air to an intake manifold which directs and distributes the air into an intake runner 29 to each combustion chamber 16. The air intake system comprises airflow ductwork and devices for monitoring and controlling the air flow. The devices preferably include a mass airflow sensor 32 for monitoring mass airflow ('MAF') and intake air temperature ('Tin'). There is a throttle valve 34, preferably an electronically controlled device which controls air flow to the engine in response to a control signal ('ETC') from the control module. There is a pressure sensor 36 in the manifold adapted to monitor manifold absolute pressure ('MAP') and barometric pressure ('BARO'). There is an external flow passage for recirculating exhaust gases from engine exhaust to the intake manifold, having a flow control valve, referred to as an exhaust gas recirculation ('EGR') valve 38. The control module 5 is operative to control mass flow of exhaust gas to the engine air intake by controlling opening of the EGR valve. As used herein, the term 'cylinder structure' refers to the engine components and elements which form each combustion chamber, i.e., walls of cylinder, piston, and head, including intake and exhaust valves.

Air flow from the intake runner 29 into each of the combustion chambers 16 is controlled by one or more intake valves 20. Flow of combusted gases from each of the combustion chambers to an exhaust manifold via exhaust runners 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling phasing, lift and duration of openings of the intake and the exhaust valves, preferably using variable lift control ('VLC') and variable cam phasing ('VCP') systems. The variable valve lift system comprises devices operative to control valve lift, or opening, to one of two distinct steps, e.g., a low-lift valve opening (about 3-6 mm) for low speed, low load operation, and a high-lift valve opening (about 8-10 mm) for high speed and high load operation. Alternatively, a continuously variable lift mechanism can be used to provide added control flexibility. The VCP systems are operable to shift valve opening and closing times relative to crankshaft and piston position, i.e., phasing, beyond that which is effected by the two-step VLC lift. There is a VCP/VLC system 22 for the engine intake and a VCP/VLC system 24 for the engine exhaust. The VCP/VLC systems 22, 24 are controlled by the control module 5, and provide signal feedback to the control module consisting of camshaft rotation position for the intake camshaft and the exhaust camshaft. When the engine is operating in an auto-ignition mode with exhaust recompression valve strategy the low lift operation is typically used, and when the engine is operating in a spark-ignition combustion mode the high lift operation typically is used.

As known to skilled practitioners, VCP/VLC systems have a limited range of authority over which opening and closings of the intake and exhaust valves can be controlled. The typical VCP system has a range of phasing authority of 30°-90° of cam shaft rotation, thus permitting the control system to advance or retard opening and closing of the engine valves. The range of phasing authority is defined and limited by the hardware of the VCP and the control system which actuates the VCP. The VCP/VLC system is actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to an engine control signal ('inj_pw') from the control module. The fuel injectors 28 are supplied pressurized fuel from a fuel distribution system (not shown).

The engine includes a spark ignition system by which spark energy is provided to a spark plug 26 for igniting or assisting in igniting cylinder charges in each of the combustion chambers, in response to an engine control signal ('IGN') from the control module. The spark plug 26 enhances the ignition timing control of the engine at certain conditions (e.g., during cold start, near a low load operation limit, and during ordinary SI engine combustion operation).

The engine is equipped with various sensing devices for monitoring engine operating states, including a crankshaft rotational speed sensor 42 having output RPM, a sensor 30 adapted to monitor combustion having output COMBUSTION, and, a sensor 40 adapted to monitor exhaust gases having output EXH, typically a wide range air/fuel ratio sensor, and a coolant sensor 35 having output coolant. The combustion sensor comprises a sensor device operative to monitor a combustion parameter and is depicted as a cylinder pressure sensor to monitor in-cylinder combustion pressure. It is understood that other sensing systems used to monitor cylinder pressure or another combustion parameter which can be translated into combustion phasing are included within the scope of the invention, e.g., ion-sense ignition systems.

The engine is designed to operate un-throttled on gasoline or similar fuel blends with auto-ignition combustion ('HCCI combustion') over an extended range of engine speeds and loads. The engine operates in spark ignition combustion mode with controlled throttle operation with conventional or modified control methods under conditions not conducive to the HCCI combustion mode operation and to attain maximum engine power to meet an operator torque request (To_req). Widely available grades of gasoline and light ethanol blends thereof are preferred fuels, however, alternative liquid and gaseous fuels such as higher ethanol blends (e.g. E80, E85), neat ethanol (E99), neat methanol (M100), butanol gasoline blends, neat butanol, natural gas, hydrogen, biogas, various reformates, syngases, and others may be used in the implementation of the present invention.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event such as a specific crank angle location.

The control module 5 executes algorithmic code stored therein to control the aforementioned actuators to specific control states to control the engine operation, including: throttle position (ETC); spark timing and dwell (ION); fuel injection mass and timing (Inj_pw); phasing, lift and duration of openings of the intake and/or exhaust valves (VCP/VLC); and, EGR valve position (EGR) to control flow of recirculated exhaust gases. The phasing, lift and duration of openings of the intake and/or exhaust valves includes negative valve overlap (NVO in an exhaust recompression strategy) and lift of exhaust valve reopening (in an exhaust re-breathing strategy). The control module is adapted to monitor input signals from the operator (e.g., an accelerator pedal position and a brake pedal position) to determine the operator torque request (To_req), and adapted to monitor engine operating states from sensors, including those indicating engine speed (RPM), engine load (using MAF, MAP, or Inj_pw), coolant temperature (coolant), intake air temperature (Tin), and other ambient conditions, to determine an engine operating point, primarily related to engine speed and load.

The control module 5 operates to determine control states for various engine actuators, including the engine valve actuation phasing, lift, duration (VCP/VLC Intake, VCP/VLC Exhaust), fuel injection timing and pulsewidth (Inj_pw) including multiple injections per cycle, spark timing and dwell (Ign), EGR valve position (EGR), and throttle position (ETC), from predetermined lookup tables and equations stored in memory, as will be described hereinafter. The control module is operative to monitor torque or load and engine speed from which engine power is calculated.

The control module further monitors engine operating states to compensate for effects of transient engine operation on the effective temperature of the cylinder structure. The intent of monitoring the engine operating states is to determine a parameter which correlates to a difference between a steady-state temperature of the cylinder structure and the effective temperature of the cylinder structure during the transient engine operation, which affects auto-ignition combustion timing and rate of combustion.

The control module monitors the engine operating states to determine and quantify an aggregate or cumulative engine power, i.e., an engine power history comprising recent engine operation and power output. The difference between current engine power and engine power history correlates to the difference between a steady-state temperature of the cylinder structure at the current operating condition of speed and load and the effective temperature of the cylinder structure during the transient engine operation, as is known to a person having ordinary skill in the art.

The state of the engine power history is preferably determined by ongoingly monitoring one or more engine operating states which are correlatable to engine power, and accumulating the monitored states. In one embodiment, accumulating the monitored states comprises inputting the states to a moving average equation which uses an elapsed time-period for averaging. The elapsed time-period for averaging is determined based upon the thermal capacity of the cylinder structure, typically in the form of a heat-transfer time-constant. In another embodiment, accumulating the monitored states comprises inputting the states to a weighted moving average equation which uses the elapsed time-period for averaging, with preferential weighting given to the most-recently monitored states. One monitored engine state which is usable as a surrogate for the engine power history comprises engine fuel flow, based upon the inj_pw command and engine speed to calculate instantaneous injector flow, INJ_FLO, from which can be determined an average fuel flow, INJ_AVG. Other methods for monitoring and determining the effective temperature of the cylinder structure during the transient engine operation and a state for the engine power history are included in so far as they fall within the scope of the invention.

Figure 2:
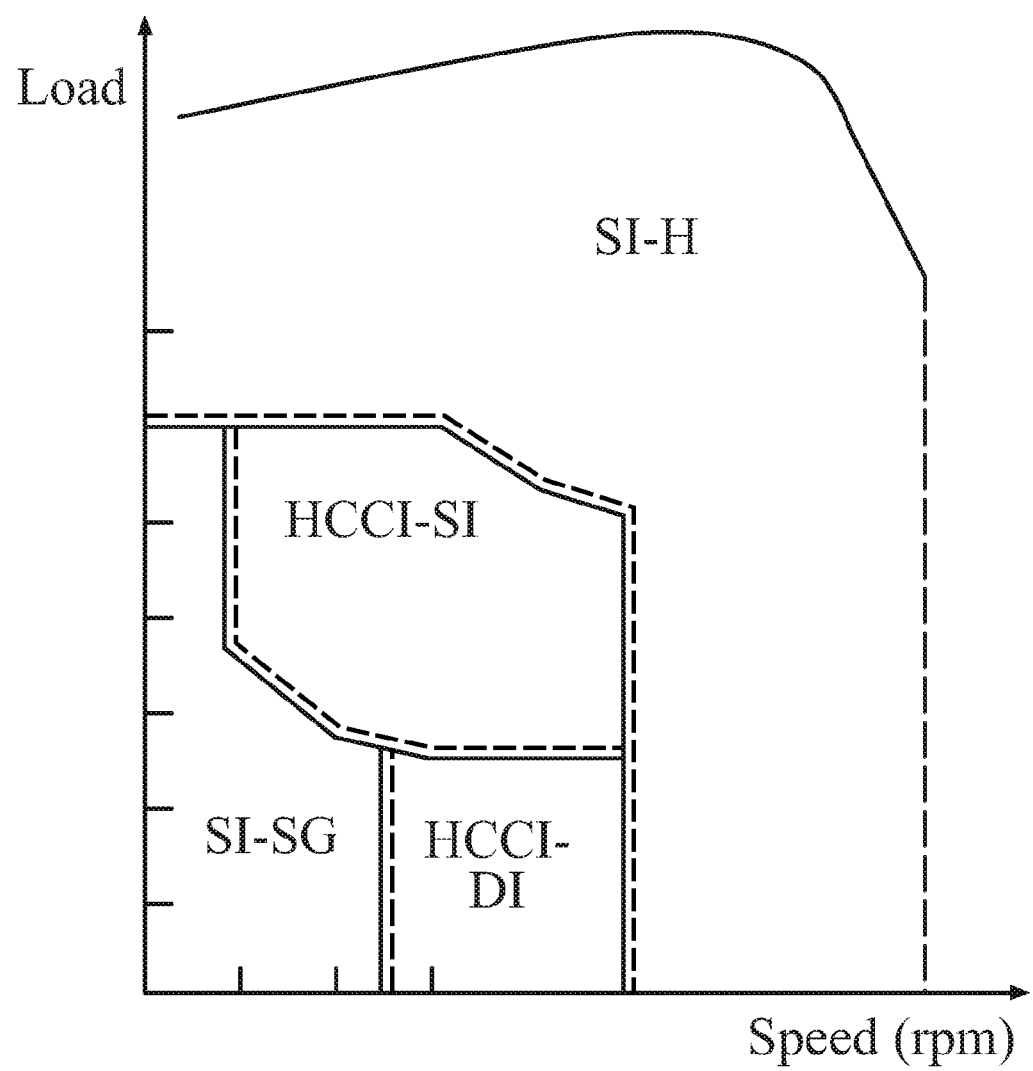
FIG. 2 is a data graph, in accordance with the present invention.

Referring now to FIG. 2, the exemplary engine is selectively operative in one of a plurality combustion modes, based upon engine operating states, in this embodiment comprising speed (RPM) and engine load, which is derivable from engine operating parameters such as injector fuel flow (INJ_PW, in milligrams), or mass air flow (MAF) or, manifold pressure (MAP). The engine combustion modes comprise a spray-guided spark-ignition (SI-SG) mode, a single injection auto-ignition (HCCI-SI) mode, and double injection auto-ignition (HCCI-DI) mode, and a homogeneous spark-ignition (SI-H) mode. A preferred speed and load operating range for each of the combustion modes is based upon optimum engine operating parameters, including combustion stability, fuel consumption, emissions, engine torque output, and others. Boundaries which define the preferred speed and load operating ranges to delineate the combustion modes are typically determined during pre-production engine calibration and development, and are executed in the engine control module. In operation, the control system monitors the engine speed (RPM) and engine load, and commands operation of the engine into one of the engine combustion modes based thereon, as depicted with reference to FIG. 2. Thus at low speed/load conditions, SI-SG combustion is commanded, whereas in the medium speed/load operating conditions, auto-ignition combustion is commanded.

The invention comprises controlling operation of the engine described hereinabove in the auto-ignition combustion mode (HCCI), including during transient operation. The engine operating point and effective temperature of the cylinder structure of the internal combustion engine are determined based upon the engine operating conditions. Engine operation is controlled using a feed-forward control scheme based upon the effective temperature of the cylinder structure and the engine operating point. When the effective temperature differs from the steady state temperature, the engine control states need to be adjusted to values that are different than the steady state values used at the engine operating point. Several engine states are known to tag commanded changes in control states, e.g., EGR, fuel pressure, cam phasing, due to physical response times of the devices and the controlled element. The control system preferably accommodates the delays in determining steady state operation. This is now described in greater detail.

Figure 3:
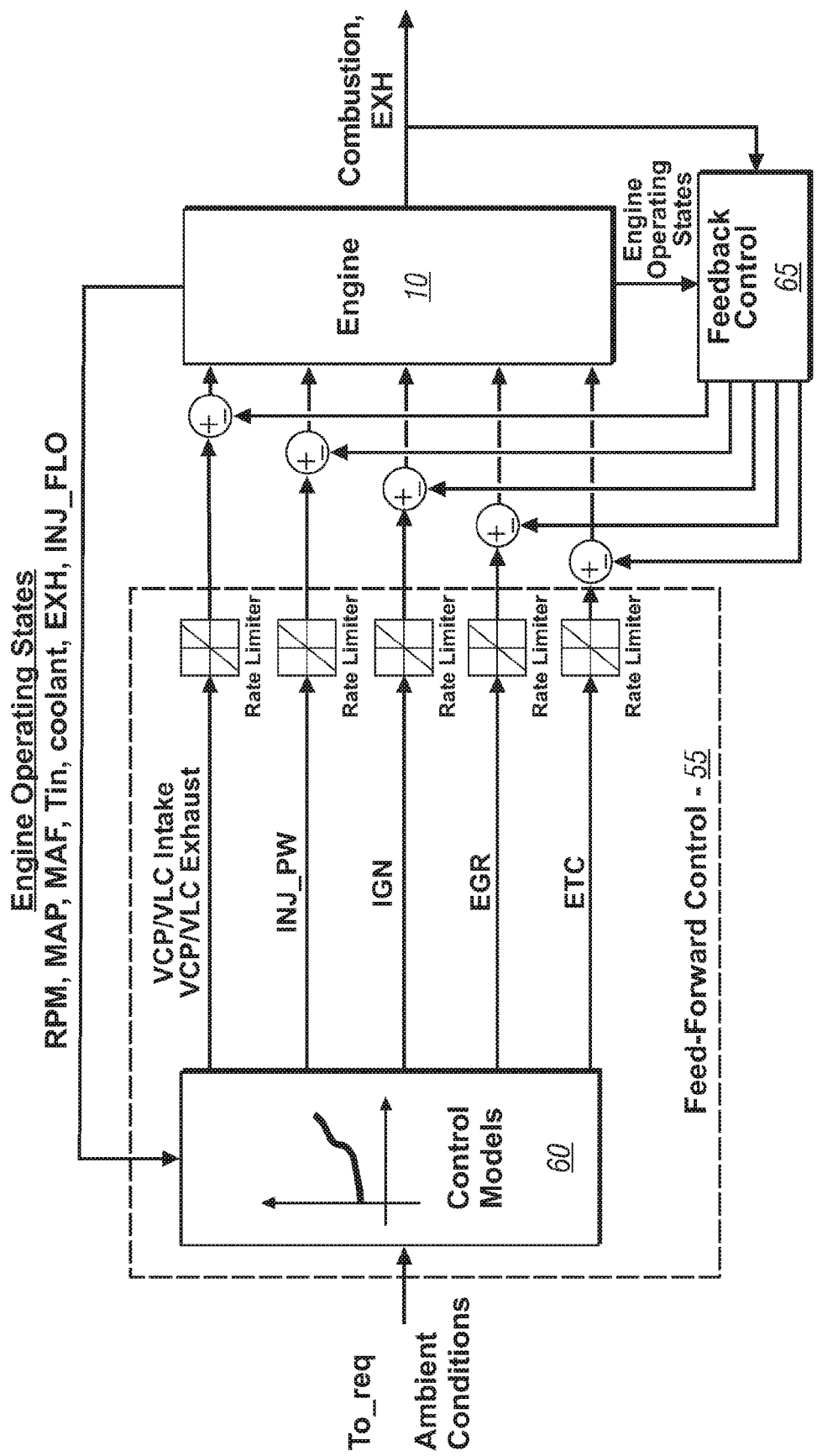
FIG. 3 is a schematic block diagram of an engine control subsystem, in accordance with the present invention; and, FIGS. 4-6 are data graphs, in accordance with the present invention.

Referring now to FIG. 3, details of controlling and operating the engine in auto-ignition combustion mode, in accordance with the invention are depicted. The engine control subsystem preferably consists of algorithmic code and calibration tables stored in one of the memory devices of the engine control module 5 for execution therein. The engine control subsystem synthesizes the operator inputs, ambient conditions, engine operating states, and combustion performance measurements, and executes algorithms to determine preferred control states of various actuators to meet the operator torque request and achieve targets for engine operation. The combustion performance measurements ('combustion') are preferably translatable to measures of ignition timing and burn duration occurring during controlled auto-ignition combustion. Ignition timing of controlled auto-ignition combustion is defined as the crank angle position, measured in degrees after top-dead-center ('deg a TDC') at which 10% of the mass fraction of the combustion chamber charge is burned ('CA10'). Burn duration of combustion is defined as the crank angle interval, in crank angle degrees ('CAD') between 10 and 90% mass fraction burned.

The engine control subsystem includes the feedforward control scheme 55 and a feedback control scheme 65. The engine control subsystem is preferably executed as part of ongoing engine control to achieve a rapid and effective system response to changes of operating conditions, typically in response to changes in the operator inputs and ambient conditions.

The feedforward control scheme 55 comprises two major elements; a control model 60, comprising precalibrated lookup tables and algorithms, and a plurality rate limiters. The precalibrated look-up tables and algorithms of the control model comprise machine-searchable arrays stored in one of the memory devices and machine-executable algorithms to determine control states for each of the engine control actuators, based upon the engine operating states, e.g., engine speed, load, intake temperature, coolant temperature, exhaust, and effective temperature of the cylinder structure. An engine operating point is determined based upon the engine speed and load. In the embodiment depicted, the control state of fuel flow, based upon INJ_FLO, is used to generate an average fuel flow, i.e., INJ_AVG, which is an indicator of the engine power history, which becomes a surrogate for the effective temperature of the cylinder structure, as described above.

A specific control state for each of the actuators is determined based upon the engine operating states, and the engine power history. The control states for each of the engine control actuators comprise actuator-appropriate command signals to control operation of the actuators. The outputs from the lookup tables are passed through one of a plurality of feed-forward rate-limiters, as depicted.

Figure 4:
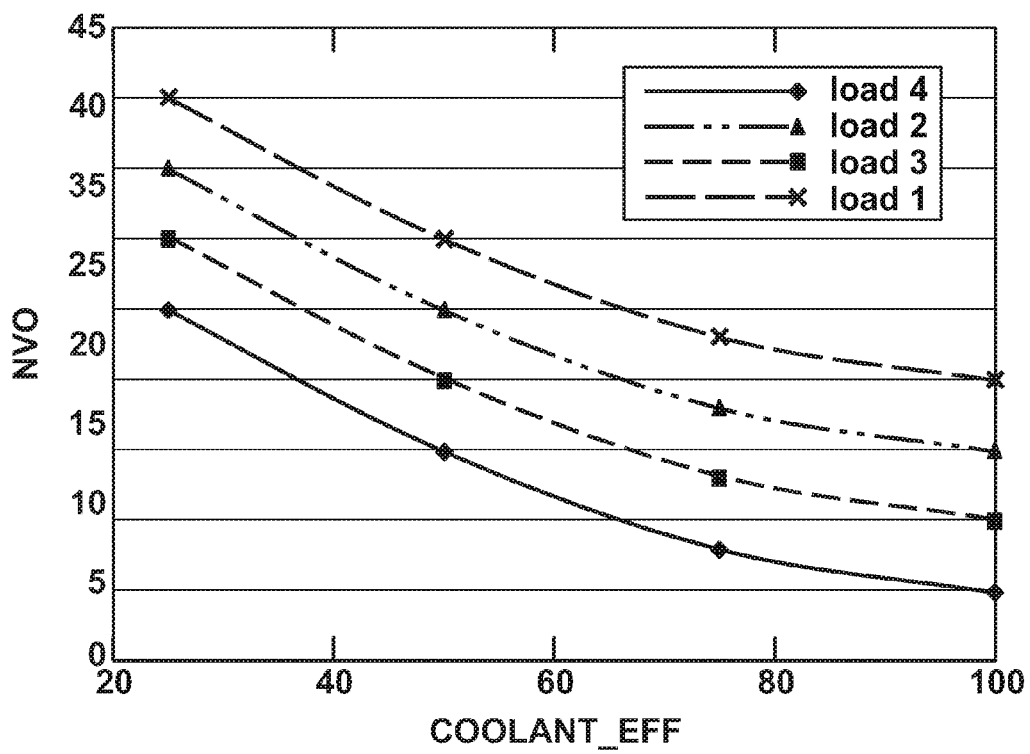
Figure 5:
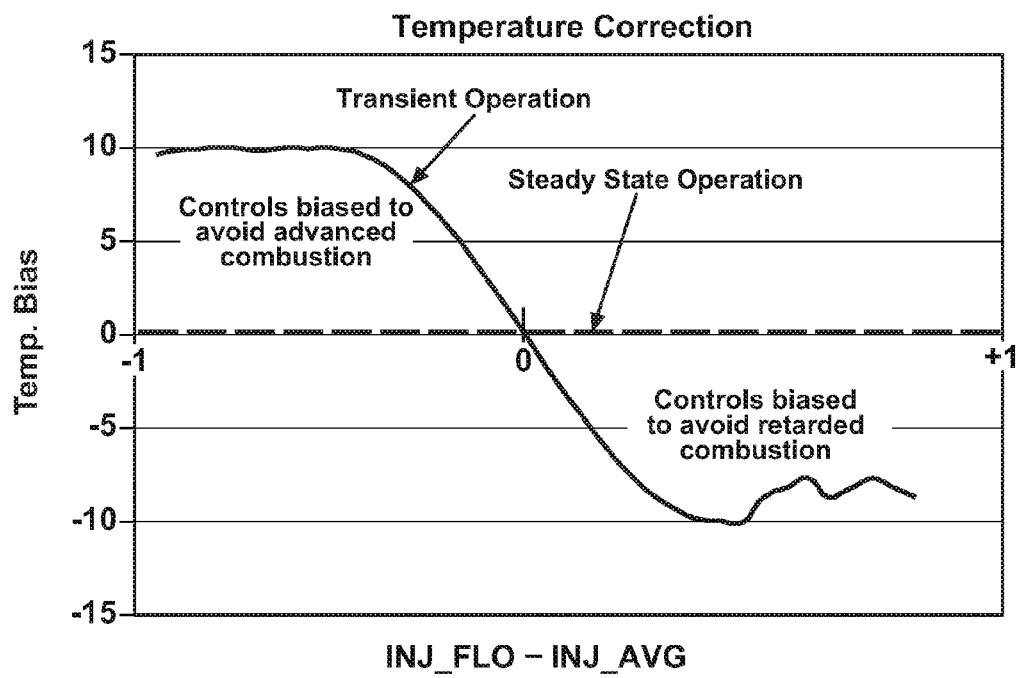

Referring now to FIG. 4, a calibration for one of the feedforward control schemes, executed as an element of control model 60, is depicted. The calibration depicts a commanded or preferred negative valve overlap (NVO) which is determined based upon engine coolant temperature (coolant), and engine load. The feed-forward model monitors coolant and engine load, and determines magnitude of NVO to command through the valve actuation system 22, 24. The instantaneous fuel flow, INJ_FLO, and the average fuel flow, INJ_AVG, can differ during a transient operation, e.g., a change in the operator torque request, or a change in operating conditions, such as going onto a grade. A temperature correction, or temperature bias, is determined based upon the instantaneous fuel flow, INJ_FLO, and the average fuel flow, INJ_AVG, depicted with reference to FIG. 5. The temperature bias is added (or subtracted) to coolant, which becomes an effective coolant temperature, i.e., coolant_eff. The control scheme uses the effective coolant temperature, i.e., coolant_eff, to determine the command for NVO, based upon the load.

Thus, during normal, steady-state operation the instantaneous fuel flow, INJ_FLO, and the average fuel flow, INJ_AVG, are substantially the same, and the effective coolant temperature is substantially equal to the coolant temperature, thus resulting in no adjustment to the NVO. During a transient operation, the instantaneous fuel flow, INJ_FLO, may differ from the average fuel flow, INJ_AVG. When the instantaneous fuel flow, INJ_FLO, is less than the average fuel flow, INJ_AVG, this indicates that the engine power history has been greater, and thus the temperature of the cylinder structure is greater than indicated by the engine operating point. Therefore, a bias is added to the measured coolant temperature, which effectively decreases the commanded NVO for the operating condition. When the instantaneous fuel flow, INJ_FLO, is greater than the average fuel flow, INJ_AVG, this indicates that the engine power history has been less, and thus the temperature of the cylinder structure is less than indicated by the engine operating point. Therefore, a bias is subtracted from the measured coolant temperature, which effectively increases the commanded NVO for the operating condition. One skilled in the art can readily translate the control concept described hereinabove to the other control states which rely upon coolant temperature as a control parameter.

The feed-forward rate limiters are preferably actuator control factors which comprise maximum and minimum rates of change of state for each of the controlled actuators. The rate limiters each compensate for component and system capabilities and dynamics. Examples of component capabilities include response times for the various actuators, dynamic operating range of fuel injectors, and valve operation leading to valve/piston collisions. Examples of system and component dynamics, include, e.g., air and fuel dynamics related to cylinder-to-cylinder imbalances of airflow, fuel, EGR fraction, and cylinder temperatures. Determination of engine control system rate limiters 80 for various actuators is known and not discussed in detail herein.

The feedback control scheme 65 is preferably an element of the engine control subsystem, and comprises adjusting control signals for each of the engine control actuators to maintain and control engine operating stability as determinable by feedback from the combustion performance measurements. The states of combustion and exh are used as feedback to adjust engine control states for each of valve actuation, fuel injection (timings and pulse widths), spark dwell and timing, EGR valve position, and throttle valve positions. Such operation seeks to maintain operation of the engine 10 to meet the aforementioned requirements.

Figure 6:
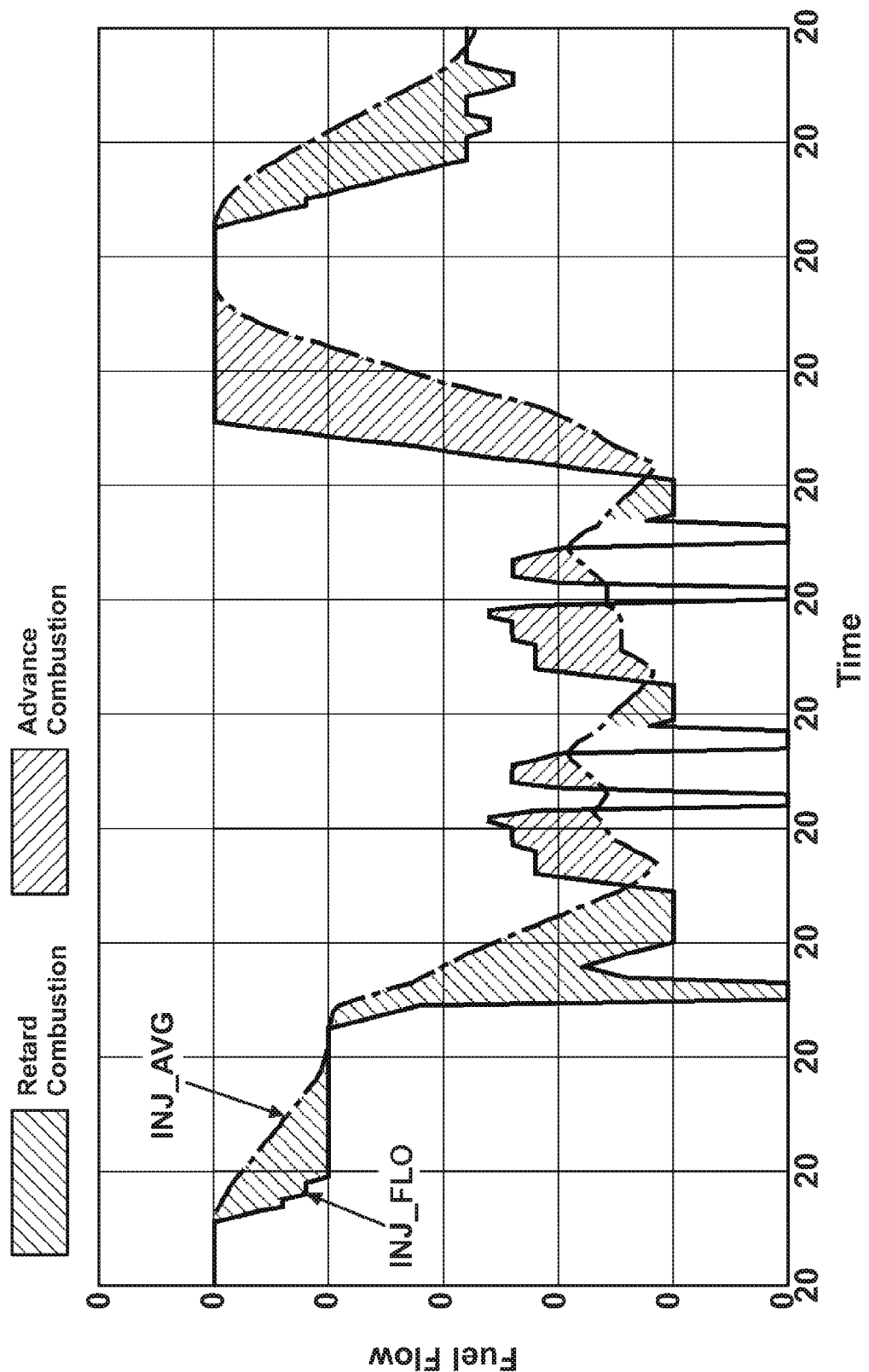

Referring now to FIG. 6, there is graphically depicted a measurement of the instantaneous fuel flow, INJ_FLO, and moving average fuel flow, inj_avg, for ongoing operation of the engine. The same results can be used to depict effective temperature of the cylinder structure as compared to a set point temperature for the engine operating point, which is determined based upon steady state operation. Under specific operating conditions, the effective temperature of the cylinder structure is less than the set point temperature, requiring engine operation which advances combustion during auto-ignition operation. Under other specific operating conditions, the effective temperature of the cylinder structure is greater than the set point temperature, requiring engine operation which retards combustion during auto-ignition operation.

As previously stated, a specific combustion mode is determined based upon the instantaneous engine speed and load, as compared to the preferred speed and load operating range for each of the combustion modes depicted with reference to FIG. 2. When the average fuel flow, inj_avg, is used as a surrogate to determine the effective temperature of the cylinder structure, and the instantaneous fuel flow INJ_FLO, is used as the indicator of engine load, the average fuel flow, INJ_AVG, can be used to expand the boundaries of the combustion modes, e.g., extend the ability of the engine to operate in the HCCI mode for a period of time during which the effective cylinder temperature adjusts during transient operation. Thus, when there is an increase in the operator torque request and engine load when operating in the HCCI mode which commands a change to the SI operating mode, the engine can continue to operate for a period of time in the HCCI mode with relatively low temperature in the cylinder structure without engine knocking or other adverse effects. Furthermore, when there is a decrease in the operator torque request and engine load when operating in the HCCI mode which commands a change to the SI operating mode, the engine can continue to operate for a period of time in the HCCI mode without the temperature in the cylinder structure falling below that necessary for auto-ignition combustion.

While the invention has been described by reference to certain embodiments, it should be understood that changes are allowable within the spirit and scope of the inventive concepts described. Accordingly, it is intended that the invention not be limited to the disclosed embodiments, but that it have the full scope permitted by the language of the following claims.

The invention claimed is:

1. Internal combustion engine system, comprising:
   an internal combustion engine, selectively operative in an auto-ignition combustion mode;
   a control module, adapted to monitor engine operating states and control engine operation; and,
   an engine control subsystem, comprising machine-executable code stored in the control module to control engine operation based upon the monitored engine operating states, comprising:
   a) code to operate the engine in the auto-ignition combustion mode;
   b) code to determine an effective temperature of a cylinder structure of the internal combustion engine based upon the engine operating conditions;
   c) code to determine an engine operating point; and,
   d) code comprising feed-forward control of the engine based upon the effective temperature of the cylinder structure and the engine operating point.

2. The internal combustion engine system of claim 1, wherein the code to determine effective temperature of the cylinder structure of the internal combustion engine comprises code to monitor engine power for an elapsed period of time.

3. The internal combustion engine system of claim 2, wherein the code to monitor engine power for a period of time comprises code to monitor engine fuel flow over the elapsed period of time.

4. The internal combustion engine system of claim 3, further comprising code to determine an average of the engine fuel flow over the elapsed period of time.

5. The internal combustion engine system of claim 3, further comprising code to determine a weighted average of the engine fuel flow over the elapsed period of time.

6. The internal combustion engine system of claim 3, wherein the period of time is determined based upon a thermal capacity of the cylinder structure.

7. The internal combustion engine system of claim 2, wherein the code to monitor engine power for a period of time comprises code to monitor engine load over the period of time.

8. The engine control subsystem of claim 1, wherein the code comprising feed-forward control of the engine based upon the effective temperature of the cylinder structure and the engine operating point comprises:
   code to determine a plurality of engine control states based upon the engine operating point; and,
   code to adjust one of the engine control states based upon the effective temperature of the cylinder structure.

9. The engine control subsystem of claim 8, wherein the code to adjust one of the engine control states based upon the effective temperature of the cylinder structure further comprising code to adjust one of the engine control states based upon a difference between the effective temperature of the cylinder structure and a steady state temperature of the cylinder structure at the engine operating point.

10. The engine control subsystem of claim 9, further comprising code to adjust the engine control state to control one of combustion timing and a rate of combustion of a cylinder charge.

11. The internal combustion engine of claim 1, wherein the code comprising feed-forward control of the engine based upon the effective temperature of the cylinder structure and the engine operating point further comprises code to control timing and a rate of combustion of a cylinder charge.

12. The internal combustion engine of claim 11, further comprising code to retard the auto-ignition combustion subsequent to a reduction in the engine operating point.

13. The internal combustion engine of claim 11, further comprising code to advance the auto-ignition combustion subsequent to an increase in the engine operating point.

14. The internal combustion engine of claim 11, wherein the code to control engine operation further comprises code to control timing and pulsewidth of actuation of a fuel injector.

15. The internal combustion engine of claim 11, wherein the code to control engine operation further comprises code to control actuation of an engine valve.

16. The internal combustion engine of claim 15, wherein the code to control actuation of the engine valve further comprises code to control one of phasings of openings and closings of intake valves and exhaust valves and position of a two-step variable lift control device.

17. The internal combustion engine system of claim 1, further comprising: code to execute a feedback control scheme to adjust engine operation based upon engine operating states and engine combustion.

18. Internal combustion engine system, comprising:
an internal combustion engine, selectively operative in an auto-ignition combustion mode and in a spark-ignition mode;
a control module, adapted to monitor engine operating states and control engine operation; and,
an engine control subsystem, executable in the control module to control the engine operation based upon the monitored engine operating states, comprising:
a) code to operate the engine in the auto-ignition combustion mode;
b) code to monitor engine power for an elapsed period of time;
c) code to determine an engine operating point; and,
d) code to execute a feed-forward control scheme to determine a plurality of engine control states based upon the engine operating point and an operator torque request, the feed-forward control scheme operative to adjust one of the engine control states based upon the engine power monitored for the elapsed period of time.

19. The internal combustion engine of claim 18, wherein the control module adapted to control engine operation comprises the control module adapted to control the engine control states.

20. The internal combustion engine of claim 18, wherein the code comprising the feed-forward control of the engine based upon the effective temperature of the cylinder structure and the engine operating point further comprises code to control timing and rate of combustion of a cylinder charge.

21. The internal combustion engine of claim 20, further comprising code to retard the auto-ignition combustion subsequent to a reduction in the engine operating point.

22. The internal combustion engine of claim 21, further comprising code to advance the auto-ignition combustion subsequent to an increase in the engine operating point.

23. The internal combustion engine of claim 18, further comprising code to transition from the auto-ignition combustion mode to the spark-ignition mode based upon the monitored engine power over an elapsed period of time, and an engine operating point; wherein the code to monitor engine power for an elapsed period of time comprises code to monitor engine fuel flow over the elapsed period of time to determine an average of the engine fuel flow over the elapsed period of time.

24. Method for controlling a homogeneous charge compression ignition engine, comprising:
providing a measured engine coolant temperature;
determining an engine coolant temperature bias based on an engine power history;
applying the engine coolant temperature bias to the measured engine coolant temperature to establish an effective engine coolant temperature; and
controlling an engine actuator as a function of the effective engine coolant temperature.

25. The method for controlling a homogeneous charge compression ignition engine of claim 24, wherein determining an engine coolant temperature bias based on an engine power history comprises:
monitoring a moving average of engine power; and
determining the engine coolant temperature bias based on the moving average of engine power.

26. The method for controlling a homogeneous charge compression ignition engine of claim 24, wherein determining an engine coolant temperature bias based on an engine power history comprises:
monitoring a moving average of engine fuel flow; and
determining the engine coolant temperature bias based on the moving average of engine fuel flow.

* * * * *